Jan. 30, 1945.     S. EGGLESTON     2,368,414
INCLINED ELEVATOR
Filed Feb. 26, 1944
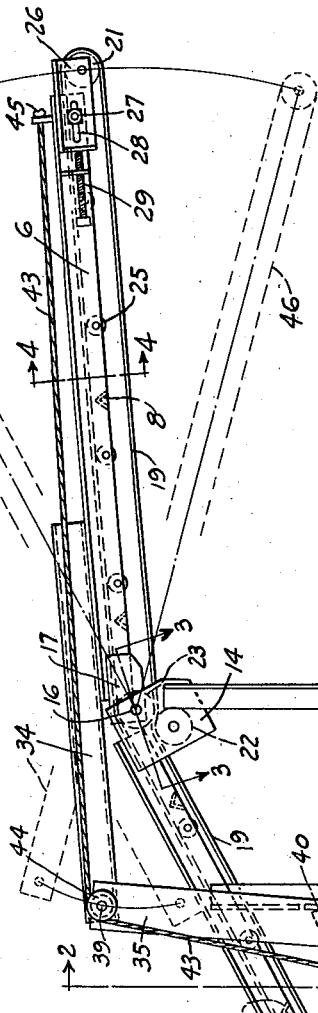
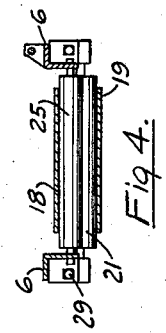
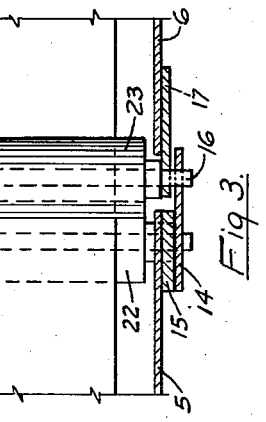
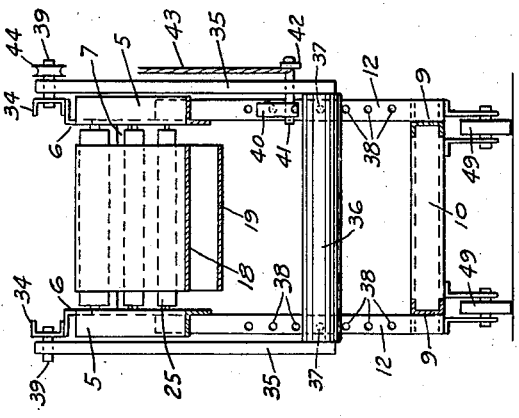
INVENTOR
*Smith Eggleston.*
BY
ATTORNEY Patented Jan. 30, 1945

2,368,414

UNITED STATES PATENT OFFICE 2,368,414

INCLINED ELEVATOR

Smith Eggleston, St. Paul, Minn., assignor to Standard Conveyor Company, North St. Paul, Minn., a corporation of Minnesota Application February 26, 1944, Serial No. 524,009

6 Claims. (Cl. 198—109)

It is an object of this invention to provide a novel inclined elevator of the portable type which is adapted for use as a piling machine and for loading and unloading trucks or other vehicles.

A particular object is to provide a simple, low cost, sectional, inclined elevator having a compact, fixed section and an articulated extension of the fixed section adapted to deliver or receive loads at various heights under control of an operator stationed either at a side of the machine or near the upper end thereof, the extension being balanced and its incline being readily adjustable while in operation.

A further object is to promote safety and simplicity in an elevator of this class by providing a novel combination balance and latch mechanism for the articulated section thereof.

My invention also includes a number of novel details of construction which facilitate the loading and unloading of large vehicles and adapt the machine for use where the available floor space is relatively small.

Referring to the accompanying drawing:

Figure 1 is a side elevational view showing my improved portable inclined elevator;

Fig. 2 is a vertical section taken on the line 2—2 of Fig. 1;

Fig. 3 is a fragmentary section taken approximately on the line 3—3 of Fig. 1, and Fig. 4 is a section taken on the line 4—4 of Fig. 1.

In the drawing the numeral 5 indicates a pair of fixed inclined rails and the numeral 6 a pair of rails which extend in continuation of the upper ends of the rails 5 and have a hinge connection therewith. The rails 5 are rigidly connected together in spaced parallel relation to each other by cross members 7 and similar members 8 connect the rails 6 together. To support the rails 5 in a predetermined inclined position I provide a rigid frame comprising members 9 and 10 forming a rectangular base and pairs of upright members 11, 12 and 13. The members 13 are rigidly fastened at their upper ends respectively to plates 14 which are, in turn, rigidly connected by spacing plates 15 to the respective rails 5, Figs. 1 and 3. Supported on the plates 14 is a horizontal shaft 16 constituting the hinge pin or pivot for the upper rails 6. As further shown in Fig. 3, each rail 6 has a hinge plate 17 fastened to its outer face and the plates 17 are perforated to receive the shaft 16.

A conveyor is supported on and arranged to move along and between the rails 5 and 6. As illustrated, this conveyor comprises an endless belt having an upper reach 18 and a lower reach 19 trained on and extending between a drum 20 mounted near the lower ends of the rails 5 and a drum 21 supported on the upper or free ends of the rails 6. To further guide and support the belt, rollers 22 and 23 are mounted on the plates 14 joining the rail sections and the upper reach 18 is supported at suitable intervals on rollers 25. At the junction of the rails 6 with the rails 5 the reach 18 runs on the upper periphery of the roller 23, which is journaled on the pivot shaft 16. The lower reach 19 passes between the rollers 22 and 23 and in contact with a roller 25a mounted between the frame members 11.

To retain uniform tension in the belt irrespective of the incline of the rails 6, I so locate the roller 22 relative to the roller 23 that the area of contact between the reach 18 and roller 23 decreases equally with the increase in area of contact of said roller with the reach 19 as the free end of the articulated section is raised. During the reverse movement of the articulated section the area of contact with the reach 18 increases equally with the decrease in area of contact with the reach 19. The tension of the belt is made adjustable by mounting the drum 21 on a pair of plates 26 which are movable longitudinally of the rails 6 and connected thereto by bolts 27 extending through elongated slots 28 formed in said plates. A thrust screw 29 is also mounted in each of the rails 6 to engage the plate 26 for the purpose of adjusting the belt tension.

Supported on the base frame members 9 and 10 is an electric motor 30 adapted to drive the drum 20 through speed reducing gears in a casing 31 and a belt 32 trained on suitable pulleys, one of which is fixed on a shaft projecting from the gear casing 31 and the other of which is fixed on an axial shaft 33 upon which the drum 20 is fastened.

Parallel arms 34 are rigidly fastened to the rails 6 so that these arms project from the pivoted end of the articulated conveyor section. Depending from the free ends of the arms 34 are arms 35 supporting a counterweight 36 between their lower ends. This counterweight normally comes to rest in contact with the frame members 12 and is provided with a pair of studs 37 adapted to fit in pairs of holes 38 formed in the frame members 12. The connections between the arms 34 and 35 comprise pivot pins 39 which permit the arms 35 to oscillate to and from the frame members 12, these pins 39 being so located as to cause the counterweight 36 to be moved into contact with the frame members 12 by gravity.

To facilitate withdrawal of the studs 37 from the holes 38 in the frame members 12, I provide a curved, cam-like member 40 which is fixed on a small rock shaft 41 mounted on one of the arms 35. An end of the rock shaft 41 projects from the outer face of the arm 35 and has an operating lever 42 fixed on its projecting end. Extending from the free end of the lever 42 is a flexible line 43 which is trained on a sheave 44 and has its opposite end attached to a small bracket 45 located near the normally upper ends of the rails 6. By applying sufficient tension on the line 43, the cam-like member 40 may be actuated to slidably engage the adjacent frame member 12 and swing the arms 35 away from the frame members 12. This withdraws the studs 37 from engagement with any pair of the holes 38. Rows of these holes are provided so that the articulated section of the conveyor may be locked at any desired incline.

It will be evident that the cam member 40 and its operating mechanism afford a control for the latch which includes the studs 37 and holes 38 for locking the articulated conveyor section in any of a wide range of different inclined positions. As indicated in Fig. 1, the rails 6 and conveyor section supported thereon may be oscillated from a depressed position indicated by the broken lines 46 to an elevated position indicated by the broken lines 47. Supporting the rigid frame at one end is a pair of wheels 49 and at the other end a caster 50 of the swivel type adapted to facilitate turning as well as other movements of the entire machine.

During the operation of the machine the motor 30 drives the conveyor belt continuously through the connections hereinbefore described. This motor is preferably of the reversible type so that the belt may be driven in either direction. The section of the conveyor carried by the rails 6 is retained in balance by the counterweight 36 and arms 34 and 35. This makes it possible to change the angle of inclination with a minimum of effort on the part of the operator. He merely places sufficient tension on the line 43 to withdraw the studs 37 from engagement with the frame members 12, as hereinbefore described in detail, and then lifts or depresses the articulated section to the desired position. When the line 43 is released the counterweight 36 actuates the studs 37 to a new locked position in a pair of the holes 38. During the usual loading or elevating operation the load units, material or packaged goods are continuously fed to the lower end of the conveyor either manually or by means of another conveyor while a workman stationed near the point of delivery removes the load units and stacks them in progressively higher tiers. As the work progresses the same workman from time to time merely adjusts the height of the delivery end while manipulating the line 43 near the bracket 45, it being unnecessary for him to descend to the floor level during the entire operation. Since the articulated section of my conveyor overhangs an unobstructed area below of considerable length, use of my machine greatly facilitates the loading and unloading of large vehicles where the load units should be delivered to or removed from points located within the vehicle a considerable distance beyond the door opening. Use of my invention results in large savings in manual labor in a number of other situations which will be evident to those skilled in this art. By maintaining the articulated section in balance I also promote safe operation since all danger of injury to workmen resulting from the falling of this section is thus avoided.

While I have illustrated and described a conveyor of the belt type associated with the sectional, articulated rails it will be evident that a conveyor of any suitable or common type, such as an endless chain and cross rod conveyor, for example, may be substituted for the belt conveyor without departing from the spirit of my invention, as defined in the appended claims.

Having described my invention, what I claim as new and desire to protect by Letters Patent is:

1. In an inclined elevator, upper and lower rail sections, a frame supporting the lower rail sections at an incline, means hingedly connecting the upper rail sections respectively in continuation of the upper ends of the lower rail sections, means operable to secure the upper rail sections in various inclined positions, a conveyor supported on and movable along and between the rails of both sections and means for maintaining said upper rail sections and the portion of said conveyor supported thereon in balance comprising a counterweight mounted in the angle beneath the lower rail sections and arm members operatively connected to the upper rail sections and supporting said counterweight.

2. In an inclined elevator, upper and lower rail sections, a frame supporting the lower rail section at an incline, means hingedly connecting the upper rail sections respectively in continuation of the upper ends of the lower rail sections, a conveyor movable along the rails of both sections and means for securing the upper rail sections in various inclined positions comprising, an arm pivotally connected to said upper rail sections and movable to and from a fixed member on said frame, coacting locking members associated with said arm and fixed member and manually operable means for controlling the position of said arm relative to said fixed member.

3. In an inclined elevator, upper and lower rail sections, a frame supporting the lower rail sections at an incline, means hingedly connecting the upper rail sections respectively in continuation of the upper ends of the lower rail sections, means operable to secure the upper rail sections in various inclined positions, a conveyor supported on and movable along the rails of both sections, a rigid arm projecting from said upper rail sections, a second arm depending from said rigid arm and a counterweight suspended on said second arm to balance the upper rail sections and portion of the conveyor supported thereon.

4. In an inclined elevator, upper and lower rail sections, a frame supporting the lower rail sections at an incline, means hingedly connecting the upper rail sections respectively in continuation of the upper ends of the lower rail sections, a conveyor supported on and movable along the rails of both sections, a rigid arm projecting from said upper rail sections, a second arm depending from said rigid arm, a counterweight suspended on said second arm to balance the upper rail sections and portion of said conveyor supported thereon, a fixed member positioned for slidable engagement with said counterweight, latch means associated with said counterweight and fixed member and normally held in locked position and a manually operable control for said latch means extending to the station of an operator near the free ends of said upper rail sections.

5. In an inclined elevator, upper and lower rail sections, a frame supporting the lower rail sections at an incline, means hingedly connecting the upper rail sections respectively in continuation of the upper ends of the lower rail sections, a conveyor supported on and movable along the rails of both sections, a rigid arm projecting from said upper rail sections, a second arm projecting from said rigid arm, a counterweight suspended on said second arm to balance the upper rail sections and portion of said conveyor supported thereon, a fixed member positioned for slidable engagement with said counterweight, a rock shaft mounted on said second arm, a cam fixed on said shaft to engage said fixed member for moving said counterweight away from said fixed member, latch members associated with said counterweight and fixed member and normally held in locked position and a line operatively connected to said rock shaft and extending to the station of an operator near the free ends of said upper rail sections for controlling said latch members.

6. In an inclined elevator, upper and lower rail sections, a frame supporting the lower rail sections at an incline, means including a horizontally extending shaft hingedly connecting the upper rail sections respectively in continuation of the upper ends of the lower rail sections, means for securing the upper rail sections in various inclined positions, an endless conveyor member movable along the rails of both sections, a roller mounted concentrically with said shaft and supporting the upper reach of said conveyor member and a second roller positioned to retain the lower reach of said conveyor member in contact with the lower periphery of said first mentioned roller in all inclined positions of the upper rail sections to thereby maintain a substantially constant total area of contact between said conveyor member and said first mentioned roller when the angle of the incline of the upper rail sections is changed.

SMITH EGGLESTON.